United States Patent
Hashimoto et al.

(10) Patent No.: US 6,395,424 B1
(45) Date of Patent: May 28, 2002

(54) HYDROGEN ABSORBING ALLOY FOR ALKALI STORAGE BATTERY, HYDROGEN ABSORBING ALLOY ELECTRODE FOR ALKALI STORAGE BATTERY, AND ALKALI STORAGE BATTERY

(75) Inventors: Takuya Hashimoto, Hirakata; Yohei Hirota; Teruhiko Imoto, both of Tokushima; Kikuko Kato, Katano; Nobuyuki Higashiyama, Ikeda; Mamoru Kimoto, Hirakata; Shin Fujitani, Hirakata; Koji Nishio, Hirakato, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/524,259

(22) Filed: Mar. 14, 2000

(30) Foreign Application Priority Data

Mar. 15, 1999 (JP) .......................................... 11-068094

(51) Int. Cl.⁷ ............................................... H01M 4/58
(52) U.S. Cl. .................................... 429/218.2; 420/900
(58) Field of Search ........................ 429/218.2; 420/900

(56) References Cited

U.S. PATENT DOCUMENTS 4,696,873 A * 9/1987 Yagasaki et al. ......... 429/218.2
5,962,165 A * 10/1999 Tsuruta et al. ........... 429/218.2

FOREIGN PATENT DOCUMENTS

| JP | 60-70665 | | 4/1985 |
| JP | 2733231 | | 12/1997 |
| JP | 2000-21396 | * | 1/2000 |

* cited by examiner

*Primary Examiner*—Laura Weiner
(74) *Attorney, Agent, or Firm*—Armstrong, Westerman & Hattori, LLP

(57) ABSTRACT

In the present invention, a hydrogen absorbing alloy obtained by sintering hydrogen absorbing alloy powder containing not less than 50% by weight of particles having a particle diameter of not more than 25 μm at a temperature of not more than 850° C. is used for a hydrogen absorbing alloy electrode for an alkali storage battery, and the hydrogen absorbing alloy electrode for an alkali storage battery is used as a negative electrode of the alkali storage battery.

12 Claims, 1 Drawing Sheet

HYDROGEN ABSORBING ALLOY FOR ALKALI STORAGE BATTERY, HYDROGEN ABSORBING ALLOY ELECTRODE FOR ALKALI STORAGE BATTERY, AND ALKALI STORAGE BATTERY

BACKGROUND OF THE INVENTION

1. Field of the Invention

The present invention relates generally to an alkali storage battery such as a nickel-hydrogen storage battery, a hydrogen absorbing alloy electrode used as a negative electrode of the alkali storage battery, and a hydrogen absorbing alloy used for the hydrogen absorbing alloy electrode, and is particularly characterized in that the hydrogen absorbing alloy used for the hydrogen absorbing alloy electrode is improved, to improve discharge characteristics in the alkali storage battery using the hydrogen absorbing alloy electrode and particularly, discharge characteristics in a case where the alkali storage battery is discharged in a low-temperature environment and a case where the alkali storage battery is discharged at a high current as well as to prevent the internal pressure of the alkali storage battery from rising.

2. Description of the Related Art

A nickel-hydrogen storage battery has been conventionally known as one of alkali storage batteries. In the nickel-hydrogen storage battery, a hydrogen absorbing alloy electrode using a hydrogen absorbing alloy for its negative electrode has been used.

In recent years, such an alkali storage battery has been employed for a power supply of each type of portable equipment or the like. Therefore, it has been necessary to increase the capacity of the alkali storage battery.

In the conventional alkali storage battery, however, the specific surface area of the hydrogen absorbing alloy used for the hydrogen absorbing alloy electrode was generally small. In the hydrogen absorbing alloy electrode, the amount of hydrogen which can be absorbed and discharged was decreased. Accordingly, it was difficult for the alkali storage battery to have a high capacity.

Therefore, in recent years a hydrogen absorbing alloy electrode using hydrogen absorbing alloy powder having a particle diameter of not more than 25 $\mu$m and having a large specific surface area to increase the amount of hydrogen which can be absorbed and discharged, to improve the capacity of an alkali storage battery has been proposed in JP-A-60-70665.

In the above-mentioned application, in fabricating the hydrogen absorbing alloy electrode, the hydrogen absorbing alloy powder is sintered at a high temperature of 950° C.

When the hydrogen absorbing alloy powder is thus sintered at a high temperature of 950° C., however, the hydrogen absorbing alloy is oxidized, so that the concentration of oxygen contained in the hydrogen absorbing alloy is increased. Consequently, the activity on the surface of the hydrogen absorbing alloy is decreased, so that an electrochemical reaction does not easily progress. Particularly, discharge characteristics in a case where the alkali storage battery is discharged under a low-temperature environment and a case where the alkali storage battery is discharged at a high current are degraded.

When the hydrogen absorbing alloy powder is sintered at the above-mentioned high temperature, a portion where hydrogen absorbing alloy particles are bonded together is made large and consequently, dense. Therefore, the specific surface area of the hydrogen absorbing alloy in the hydrogen absorbing alloy electrode is decreased, so that the capacity of the alkali storage battery is decreased. Further, gas absorption performance in the hydrogen absorbing alloy electrode is degraded. Oxygen gas produced inside the alkali storage battery when the battery is overdischarged, for example, cannot be sufficiently absorbed. Accordingly, the internal pressure of the battery rises.

SUMMARY OF THE INVENTION

A first object of the present invention is to improve, in a hydrogen absorbing alloy electrode used as a negative electrode of an alkali storage battery such as a nickel-hydrogen storage battery, the hydrogen absorbing alloy used for the hydrogen absorbing alloy electrode, to improve discharge characteristics in the alkali storage battery and particularly, discharge characteristics in a case where the alkali storage battery is discharged under a low-temperature environment and a case where the alkali storage battery is discharged at a high current.

A second object of the present invention is to improve gas absorbability in a hydrogen absorbing alloy electrode for an alkali storage battery, to prevent the internal pressure of the alkali storage battery from rising.

In a hydrogen absorbing alloy for an alkali storage battery in the present invention, hydrogen absorbing alloy powder containing not less than 50% by weight of particles having a particle diameter of not more than 25 $\mu$m is sintered at a temperature of not more than 850° C.

In a hydrogen absorbing alloy electrode for an alkali storage battery in the present invention, a hydrogen absorbing alloy obtained by sintering hydrogen absorbing alloy powder containing not less than 50% by weight of particles having a particle diameter of not more than 25 $\mu$m at a temperature of not more than 850° C., as described above, is used.

In an alkali storage battery according to the present invention, a hydrogen absorbing alloy electrode using a hydrogen absorbing alloy obtained by sintering hydrogen absorbing alloy powder containing not less than 50% by weight of particles having a particle diameter of not more than 25 $\mu$m at a temperature of not more than 850° C., as described above, is used as its negative electrode.

When the hydrogen absorbing alloy powder containing not less than 50% by weight of particles having a particle diameter of not more than 25 $\mu$m is sintered at a temperature of not more than 850° C., as in the present invention, the hydrogen absorbing alloy is prevented from being oxidized, so that the concentration of oxygen contained in the hydrogen absorbing alloy is decreased. Accordingly, the activity on the surface of the hydrogen absorbing alloy is prevented from being decreased. When the hydrogen absorbing alloy electrode using the hydrogen absorbing alloy is used as a negative electrode of the alkali storage battery, therefore, an electrochemical reaction in the hydrogen absorbing alloy electrode is accelerated. Particularly, the alkali storage battery has a sufficient discharge capacity even in a case where it is discharged under a low-temperature environment and a case where it is discharged at a high current, resulting in improved low-temperature discharge characteristics and high-rate discharge characteristics in the alkali storage battery. When the particle diameter of the hydrogen absorbing alloy powder is less than 1 $\mu$m, it is difficult to handle the powder in processes. Accordingly, it is preferable to use hydrogen absorbing alloy powder having a particle diameter of not less than 1 $\mu$m.

Furthermore, in the present invention, the hydrogen absorbing alloy powder is sintered at a temperature of not more than 850° C., as described above. Accordingly, a portion where hydrogen absorbing alloy particles are bonded together is prevented from being made large and consequently, precise as in a case where the powder is sintered at a high temperature of 950° C. Therefore, the specific surface area of the hydrogen absorbing alloy in the hydrogen absorbing alloy electrode is kept large, so that the alkali storage battery has a sufficient capacity. Further, the number of voids in the hydrogen absorbing alloy electrode is increased, so that gas absorption performance in the hydrogen absorbing alloy electrode is improved. Gas produced inside the alkali storage battery is sufficiently absorbed by the hydrogen absorbing alloy electrode. Accordingly, the internal pressure of the battery is prevented from rising.

In the present invention, in order to further reduce the concentration of oxygen contained in the hydrogen absorbing alloy, it is preferable to use, as the hydrogen absorbing alloy powder, one ground in an inert atmosphere. For example, it is preferable to use hydrogen absorbing alloy powder ground in an inert gas atmosphere such as argon and an inert solvent such as carbon tetrachloride, toluene, or xylene. Further, it is possible to use a known grinding method as a method of grinding the hydrogen absorbing alloy. For example, a ball mill, jet mill, or an agitation mill can be used.

As the type of hydrogen absorbing alloy used in the present invention, it is possible to use a known misch metal alloy or a Laves phase alloy which is generally used.

It is possible to use, as the misch metal alloy, one expressed by a constitutional formula of $MmNi_aCo_bAl_cM_d$ having a $CaCu_5$ type crystal structure, for example. In the constitutional formula, Mm is a misch metal, and M is at least one element selected from Mn and cu. The ratio of atoms a, b, c, and d satisfies conditions of $3.0 \leq a \leq 5.2$, $0.1 \leq b \leq 1.2$, $0.1 \leq c \leq 0.9$, $0.1 \leq d \leq 0.8$, and $4.4 \leq a+b+c+d \leq 5.4$.

It is possible to use, as the Laves phase alloy, one expressed by a constitutional formula of $Zr_pTi_{1-p}Ni_qCo_rM_s$ having a C14 or C15 type Laves phase structure, for example. In the constitutional formula, M is at least one element selected from Al, Mn, V, Mo, and Cr. The ratio of atoms p, q, r, and s satisfies conditions of $0 \leq p \leq 1.0$, $1.0 \leq q \leq 2.0$, $0.2 \leq r \leq 1.0$, $0.2 \leq s \leq 0.8$, and $1.8 \leq p+q+r+s \leq 2.2$.

In the alkali storage battery in the present invention, in order to further accelerate an electrochemical reaction in the hydrogen absorbing alloy electrode used as its negative electrode to further improve discharge characteristics in a case where the alkali storage battery is discharged under a low-temperature environment and a case where the alkali storage battery is discharged at a high current, it is preferable that the concentration of oxygen contained in the hydrogen absorbing alloy obtained by the sintering is not more than 0.30% by weight.

In the alkali storage battery in the present invention, in order to further improve gas absorption performance in the hydrogen absorbing alloy electrode used as its negative electrode, it is preferable that the specific surface area of the hydrogen absorbing alloy obtained by the sintering is not less than 0.030 m²/g.

There and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
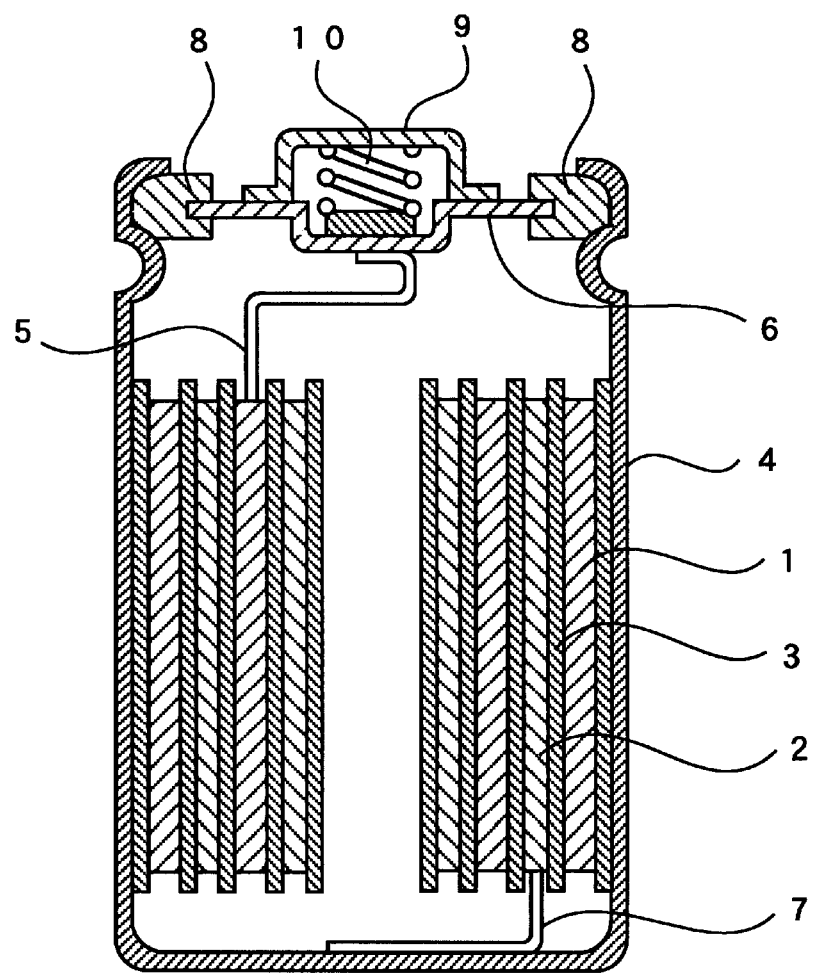
FIG. 1 is a schematic cross-sectional view showing the internal construction of each of alkali storage batteries in examples and comparative examples of the present invention.

Examples of the present invention will be specifically described, and it will be clarified by taking comparative examples that in alkali storage batteries in the examples, low-temperature discharge characteristics and high-rate discharge characteristics are improved, and the internal pressures of the batteries are prevented from rising. The present invention is not particularly limited to alkali storage batteries shown in the following examples, and can be embodied by being suitably modified in the range in which the gist thereof is not changed.

EXAMPLES 1 TO 9 AND COMPARATIVE EXAMPLES 1 TO 9

In each of examples 1 to 9 and comparative examples 1 to 9, in obtaining hydrogen absorbing alloy particles used for a hydrogen absorbing alloy electrode, a misch metal (Mm) which is a mixture of rare earth elements and Ni, Co, Al and Mn which are respectively metal simple substances having a purity of 99.9% were mixed in the molar ratio of 1.0:3.1:0.8:0.4:0.7. A mixture obtained was dissolved by a melting furnace in an argon atmosphere, and was naturally cooled, to produce an ingot of a hydrogen absorbing alloy indicated by a composition formula of $MmNi_{3.1}Co_{0.8}Al_{0.4}Mn_{0.7}$. The ingot of the hydrogen absorbing alloy was coarsely ground in the argon atmosphere, to obtain coarse powder, having an average particle diameter of 150 μm, of the hydrogen absorbing alloy.

The coarse powder, having an average particle diameter of 150 μm, of the hydrogen absorbing alloy was ground using a ball mill in carbon tetrachloride which is an inert solvent containing no oxygen, to obtain hydrogen absorbing alloy powder having an average particle diameter of 65 μm. The hydrogen absorbing alloy powder was classified using a screen made of stainless steel, to obtain hydrogen absorbing alloy particles having five types of particle diameters, that is, hydrogen absorbing alloy particles $a_1$ having a particle diameter of not more than 25 μm, hydrogen absorbing alloy particles $a_2$ having a particle diameter of 25 to 37 μm, hydrogen absorbing alloy particles $a_3$ having a particle diameter of 37 to 46 μm, hydrogen absorbing alloy particles $a_4$ having a particle diameter of 46 to 74 μm, and hydrogen absorbing alloy particles $a_5$ having a particle diameter of 74 to 100 μm.

On the other hand, the coarse powder, having an average particle diameter of 150 μm, of the hydrogen absorbing alloy was ground by a supersonic jet mill using compressed air, to obtain hydrogen absorbing alloy powder having an average particle diameter of 65 μm. The hydrogen absorbing alloy powder was classified using a screen made of stainless steel, to obtain hydrogen absorbing alloy particles having five types of particle diameters, that is, hydrogen absorbing alloy particles $b_1$ having a particle diameter of not more than 25 μm, hydrogen absorbing alloy particles $b_2$ having a particle diameter of 25 to 37 μm, hydrogen absorbing alloy particles $b_3$ having a particle diameter of 37 to 46 μm, hydrogen absorbing alloy particles $b_4$ having a particle diameter of 46 to 74 μm, and hydrogen absorbing alloy particles $b_5$ having a particle diameter of 74 to 100 μm.

In the examples 1 to 9 and the comparative examples 1 to 9, in fabricating hydrogen absorbing alloy electrodes, different types of hydrogen absorbing alloy powder obtained by mixing the hydrogen absorbing alloy particles $a_1$ to $a_5$ and $b_1$ obtained in the above-mentioned manner, respectively, at ratios (weight ratios) shown in the following Table 1 were used. 20 parts by weight of a 5% solution by weight of polyethylene oxide that is a binder was mixed with 100 parts by weight of each type of hydrogen absorbing alloy powder, to prepare a paste. The paste was applied to both surfaces of a core composed of a punching metal which was nickel-plated, followed by drying at room temperature. Thereafter, the core which was coated with the paste was cut to predetermined lengths, followed by sintering in an electric furnace, into which argon was introduced, for two hours at a temperature shown in the following Table 1, to obtain a hydrogen absorbing alloy electrode.

With respect to each of the hydrogen absorbing alloy electrodes in the examples 1 to 9 and the comparative examples 1 to 9 which were fabricated in the above-mentioned manner, the hydrogen absorbing alloy was stripped from the core, and the concentration of oxygen contained in the hydrogen absorbing alloy was measured. The results thereof were together shown in the following Table 1.

COMPARATIVE EXAMPLE 10

In a comparative example 10, a paste was prepared using only the hydrogen absorbing alloy particles a, having a particle diameter of not more than 25 μm, as in the example 1, as shown in the following Table 1. The paste was applied to both surfaces of a core composed of a punching metal which was nickel-plated, followed by drying at room temperature, to fabricate a hydrogen absorbing alloy electrode without obtaining a hydrogen absorbing alloy by sintering.

Alkali storage batteries in the examples 1 to 9 and the comparative examples 1 to 10 having a battery capacity of 1000 mA which are in the shape of a cylinder of AA size and are of a positive electrode control type, as shown in FIG. 1, were then fabricated using as their negative electrodes the hydrogen absorbing alloy electrodes fabricated in the above-mentioned manner.

In each of the alkali storage batteries, a sintered nickel electrode fabricated by immersing a nickel nitrate solution having 3 mole % of cobalt nitrate and 7 mole % of zinc nitrate added thereto in a sintered nickel substrate having a porosity of 85% was used as its positive electrode, a non-woven fabric having alkali resistance was used as a separator, and 30% by weight of a potassium hydroxide solution was used as an electrolyte.

In fabricating the alkali storage battery, a separator 3 was interposed between a positive electrode 1 and a negative electrode 2 and was spirally wound, was contained in a negative electrode can 4, and was then sealed by pouring the above-mentioned electrolyte into the negative electrode can 4, to connect the positive electrode 1 to a sealing cover 6 through a positive electrode lead 5 as well as to connect the negative electrode 2 to the negative electrode can 4 through a negative electrode lead 7, as shown in FIG. 1. The negative electrode can 4 and the sealing cover 6 were electrically insulated from each other by an insulating packing 8, and a coil spring 10 was provided between the sealing cover 6 and a positive electrode external terminal 9. When the internal pressure of the battery abnormally rose, the coil spring 10 was compressed, so that gas inside the battery was released in the air.

Low-temperature discharge characteristics and high-rate discharge characteristics were examined with respect to the alkali storage batteries in the examples 1 to 9 and the comparative examples 1 to 10 thus fabricated. The results thereof were together shown in the following Table 1.

With respect to the low-temperature discharge characteristics, each of the alkali storage batteries was charged for 16 hours at a constant charging current of 100 mA under ordinary temperature, and was then discharged to a discharge final voltage of 1.0 V at a constant discharging current of 2000 mA under low-temperature conditions of 0° C. A discharge capacity at this time was measured.

With respect to the high-rate discharge characteristics, each of the alkali storage batteries was charged for 1.2 hours at a constant charging current of 1000 mA under ordinary temperature, and was then discharged to a discharge final voltage of 1.0 V at a constant discharging current of 1000 mA. A discharge capacity $Q_1$ (mAh) at this time was measured. Thereafter, the alkali storge battery was charged for 1.2 hours at a constant charging current of 1000 mA, and was then discharged to a discharge final voltage of 1.0 V at a high discharging current of 4000 mA. A discharge capacity $Q_2$ (mAh) at this time was measured. The high-rate discharge characteristics were found by the following equation.

$$\text{High-rate discharge characteristics} = Q_2/Q_1$$

TABLE 1

| | type of hydrogen absorbing alloy particles, weight ratio | sintering temperature (° C.) | concentration of contained oxygen (% by weight) | low-temperature discharge characteristics (mAh) | high-rate discharge characteristics |
|---|---|---|---|---|---|
| example 1 | $a_1 = 100$ | 700 | 0.24 | 930 | 0.93 |
| example 2 | $a_1:a_2 = 75:25$ | 730 | 0.25 | 925 | 0.92 |
| example 3 | $a_1:a_2 = 50:50$ | 750 | 0.25 | 935 | 0.91 |
| example 4 | $a_1:a_3 = 50:50$ | 760 | 0.26 | 940 | 0.91 |
| example 5 | $a_1:a_4 = 50:50$ | 780 | 0.28 | 935 | 0.90 |
| example 6 | $a_1:a_5 = 50:50$ | 800 | 0.30 | 935 | 0.90 |
| example 7 | $a_1:b_1 = 90:10$ | 720 | 0.40 | 900 | 0.80 |
| example 8 | $a_1:b_1 = 50:50$ | 700 | 0.41 | 910 | 0.81 |
| example 9 | $b_1 = 100$ | 700 | 0.42 | 905 | 0.82 |
| comparative example 1 | $a_1 = 100$ | 900 | 0.33 | 890 | 0.75 |
| comparative | $a_1:b_2 = 75:25$ | 930 | 0.35 | 880 | 0.75 |

TABLE 1-continued

| | type of hydrogen absorbing alloy particles, weight ratio | sintering temperature (° C.) | concentration of contained oxygen (% by weight) | low-temperature discharge characteristics (mAh) | high-rate discharge characteristics |
|---|---|---|---|---|---|
| example 2 | | | | | |
| comparative example 3 | $a_1:a_2 = 50:50$ | 950 | 0.37 | 890 | 0.73 |
| comparative example 4 | $a_1:a_3 = 50:50$ | 960 | 0.37 | 880 | 0.73 |
| comparative example 5 | $a_1:a_4 = 50:50$ | 980 | 0.38 | 885 | 0.72 |
| comparative example 6 | $a_1:a_5 = 50:50$ | 1000 | 0.40 | 885 | 0.65 |
| comparative example 7 | $a_1:b_1 = 90:10$ | 920 | 0.45 | 850 | 0.63 |
| comparative example 8 | $a_1:b_1 = 50:50$ | 900 | 0.47 | 860 | 0.60 |
| comparative example 9 | $b_1 = 100$ | 900 | 0.48 | 850 | 0.60 |
| comparative example 10 | $a_1 = 100$ | not sintered | — | 890 | 0.68 |

As apparent from the results, the concentration of oxygen contained in the hydrogen absorbing alloy obtained by sintering the hydrogen absorbing alloy powder containing 50% by weight of particles having a particle diameter of not more than 25 μm at a temperature of not more than 850° C., as in the examples 1 to 9, was lower, as compared with that in the hydrogen absorbing alloy obtained by sintering the same hydrogen absorbing alloy particles at a temperature exceeding 850° C., as in the comparative examples 1 to 9.

The alkali storage batteries in the examples 1 to 9 each using as its negative electrode the hydrogen absorbing alloy electrode using the above-mentioned hydrogen absorbing alloy were improved in low-temperature discharge characteristics and high-rate discharge characteristics, as compared with the alkali storage batteries in the comparative examples 1 to 9 and the alkali storage battery in the comparative example 10 each using as its negative electrode the hydrogen absorbing alloy electrode using the hydrogen absorbing alloy which was not obtained by sintering.

The alkali storage batteries in the examples 1 to 9 were compared. The alkali storage batteries in the examples 1 to 6 using the hydrogen absorbing alloys each containing oxygen whose concentration is not more than 0.30% by weight were further improved in low-temperature discharge characteristics and high-rate discharge characteristics, as compared with the alkali storage batteries in the examples 7 to 9 using the hydrogen absorbing alloys each containing the hydrogen absorbing alloy particles $b_1$ ground by a supersonic jet mill using compressed air and containing oxygen whose concentration exceeds 0.30% by weight.

Furthermore, the alkali storage batteries in the examples 1 to 6 were compared. As the ratio of the hydrogen absorbing alloy particles having a small particle diameter was increased, and the sintering temperature was decreased, the concentration of oxygen contained in the hydrogen absorbing alloy was decreased, and the low-temperature discharge characteristics and the high-rate discharge characteristics are improved.

COMPARATIVE EXAMPLES 11 to 14

In comparative examples 11 to 14, hydrogen absorbing alloy particles $a_1$ to $a_5$ produced by grinding in an atmosphere in which there exists no oxygen were used, as described above, and different types of hydrogen absorbing alloy powder containing 25 parts by weight of hydrogen absorbing alloy particles $a_1$ having a particle diameter of not more than 25 μm and 75 parts by weight of hydrogen absorbing alloy particles $a_2$ to $a_5$ having particle diameters exceeding 25 μm were used, as shown in the following Table 2. 20 parts by weight of a 5% solution by weight of polyethylene oxide that is a binder was mixed with 100 parts by weight of each type of hydrogen absorbing alloy powder, to prepare a paste. The paste was applied to both surfaces of a core composed of a punching metal which was nickel-plated, followed by drying at room temperature. Thereafter, the core which was coated with the paste was cut to predetermined lengths, followed by sintering in an electric furnace, into which argon was introduced, for two hours at a temperature shown in the following Table 2, to obtain a hydrogen absorbing alloy electrode.

The hydrogen absorbing alloy electrodes thus fabricated were used, to fabricate alkali storage batteries in the comparative examples 11 to 14, as in the examples 1 to 9 and the comparative examples 1 to 10. With respect to each of the alkali storage batteries thus fabricated, low-temperature discharge characteristics and high-temperature discharge characteristics were measured in the above-mentioned manner. The results thereof were together shown in the following Table 2.

TABLE 2

| | type of hydrogen absorbing alloy particles, weight ratio | sintering temperature (° C.) | low-temperature discharge characteristics (mAh) | high-rate discharge characteristics |
|---|---|---|---|---|
| comparative example 11 | $a_1:a_2 = 25:75$ | 850 | 890 | 0.78 |
| comparative example 12 | $a_1:a_3 = 25:75$ | 900 | 885 | 0.76 |
| comparative example 13 | $a_1:a_4 = 25:75$ | 950 | 870 | 0.75 |
| comparative | $a_1:a_5 = 25:75$ | 1000 | 875 | 0.72 |

TABLE 2-continued

| | type of hydrogen absorbing alloy particles, weight ratio | sintering temperature (° C.) | low-temperature discharge characteristics (mAh) | high-rate discharge characteristics |
|---|---|---|---|---|
| example 14 | | | | |

As apparent from the results, the alkali storage batteries in the examples 1 to 9 each using the hydrogen absorbing alloy fabricated using the hydrogen absorbing alloy powder containing not less than 50% by weight of the particles having a particle diameter of not more than 25 μm, as described above, were improved in low-temperature discharge characteristics and high-rate discharge characteristics, as compared with the alkali storage batteries in the comparative examples 11 to 14 each using the hydrogen absorbing alloy fabricated using the hydrogen absorbing alloy powder containing less than 50% by weight of the particles having a particle diameter of not more than 25 μm.

EXAMPLES 15 to 18

In examples 15 to 18, hydrogen absorbing alloy electrodes were fabricated using only the hydrogen absorbing alloy particles $a_1$ having a particle diameter of not more than 25 μm, as in the above-mentioned example 1. The sintering temperature was set to 700° C. which is the same as that in the example 1, while only a sintering time period was changed. The sintering time period was set to 4 hours in the example 15, 6 hours in the example 16, 8 hours in the example 17, and 10 hours in the example 18, to fabricate the hydrogen absorbing alloy electrodes.

Also with respect to each of the hydrogen absorbing alloy electrodes fabricated in the examples 15 to 18, a hydrogen absorbing alloy was stripped from a core, and the concentration of oxygen contained in the hydrogen absorbing alloy was measured. Further, the specific surface area of each of the hydrogen absorbing alloys in the example 1 and the examples 15 to 18 was measured. The results thereof were shown in Table 3.

The hydrogen absorbing alloy electrodes fabricated in the above-mentioned manner were used, to fabricate alkali storage batteries in the examples 15 to 18, as in the examples 1 to 9 and the comparative examples 1 to 10.

Internal pressure characteristics in each of the alkali storage batteries in the example 1 and the examples 15 to 18 were examined. The results thereof were together shown in the following Table 3.

With respect to the internal pressure characteristics, each of the alkali storage batteries was charged at a constant charging current of 1000 mA under ordinary temperature, to find a charging time period elapsed until the internal pressure of the battery reached 10 kgf/cm².

TABLE 3

| | sintering temperature (° C.) | sintering time (hour) | concentration of oxygen (% by weight) | specific surface area (m²/g) | internal pressure characteristics (min) |
|---|---|---|---|---|---|
| example 1 | 700 | 2 | 0.24 | 0.041 | 140 |
| example 15 | 700 | 4 | 0.26 | 0.030 | 135 |
| example 16 | 700 | 6 | 0.27 | 0.021 | 110 |
| example 17 | 700 | 8 | 0.27 | 0.015 | 105 |
| example 18 | 700 | 10 | 0.29 | 0.009 | 100 |

As apparent from the results, as the sintering time period was lengthened, the concentration of oxygen contained in the hydrogen absorbing alloy was increased, and the specific surface area of the hydrogen absorbing alloy was decreased.

The respective internal pressure characteristics in the alkali storage batteries in the examples 1 and 15 to 18 were compared. In the alkali storage batteries in the examples 1 and 15 each using the hydrogen absorbing alloy having a specific surface area of not less than 0.030 m²/g, the charging time period elapsed until the internal pressure of the battery reached 10 kgf/cm² was longer, as compared with that in the alkali storage batteries in the examples 16 to 18 each using the hydrogen absorbing alloy having a specific surface area of less than 0.030 m²/g, so that the internal pressure characteristics were improved.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A hydrogen absorbing alloy for an allki storage battery, wherein hydrogen absorbing alloy powder containing not less than 50% by weight of particles having a particle diameter of not more than 25 μm is sintered at a temperature of not more than 850° C., the concentration of oxygen contained in said hydrogen absorbing alloy obtained by the sintering being not more than 0.30% by weight.

2. The hydrogen absorbing alloy according to claim 1, wherein said hydrogen absorbing alloy powder is ground in an inert atmosphere.

3. A hydrogen absorbing alloy for an alkali storage battery, wherein hydrogen absorbing alloy powder containing not less than 50% by weight of particles having a particle diameter of not more than 25 μm is sintered at a temperature of not more than 850° C., the specific surface area of said hydrogen absorbing alloy obtained by the sintering being not less than 0.030 m²/g.

4. The hydrogen absorbing alloy according to claim 3, wherein said hydrogen absorbing alloy powder is ground in an inert atmosphere.

5. A hydrogen absorbing alloy electrode for an alkali storage battery using a hydrogen absorbing alloy, wherein a hydrogen absorbing alloy obtained by sintering hydrogen absorbing alloy powder containing not less than 50% by weight of particles having a particle diameter of not more than 25 μm at a temperature of not more than 850° C. is used as said hydrogen absorbing alloy, the concentration of oxygen contained in said hydrogen absorbing alloy obtained by the sintering being not more than 0.30% by weight.

6. The hydrogen absorbing alloy electrode according to claim 5, wherein said hydrogen absorbing alloy powder is ground in an inert atmosphere.

7. A hydrogen absorbing alloy electrode for an alkali storage battery using a hydrogen absorbing alloy, wherein a hydrogen absorbing alloy obtained by sintering hydrogen absorbing alloy powder containing not less than 50% by weight of particles having a particle diameter of not more than 25 µm at a temperature of not more than 850° C. is used as said hydrogen absorbing alloy, the specific surface area of said hydrogen absorbing alloy obtained by the sintering being not less than 0.030 m$^2$/g.

8. The hydrogen absorbing alloy electrode according to claim 7, wherein said hydrogen absorbing alloy powder is ground in an inert atmosphere.

9. An alkali storage battery using a hydrogen absorbing alloy electrode as a negative electrode, wherein a hydrogen absorbing alloy obtained by sintering hydrogen absorbing alloy powder containing not less than 50% by weight of particles having a particle diameter of not more than 25 µm at a temperature of not more than 850° C. is used for the hydrogen absorbing alloy electrode, the concentration of oxygen contained in said hydrogen absorbing alloy obtained by the sintering being not more than 0.30% by weight.

10. The alkali storage battery according to claim 9, wherein said hydrogen absorbing alloy powder is ground in an inert atmosphere.

11. An alkali storage battery using a hydrogen absorbing alloy electrode as a negative electrode, wherein a hydrogen absorbing alloy obtained by sintering hydrogen absorbing alloy powder containing not less than 50% by weight of particles having a particle diameter of not more than 25 µm at a temperature of not more than 850° C. is used for the hydrogen absorbing alloy electrode, the specific surface area of said hydrogen absorbing alloy obtained by the sintering being not less than 0.030 m$^2$/g.

12. The alkali storage battery according to claim 11, wherein said hydrogen absorbing alloy powder is ground in an inert atmosphere.

* * * * *